3,462,394
Patented Aug. 19, 1969

3,462,394
PROCESS FOR STABILIZING
POLYOXYMETHYLENE
Shin'ichi Ishida, Tokyo, Toshio Kato, Ohmiya-shi, Masakazu Kurihara, Warabi-shi, and Yasunobu Takahashi and Hiromichi Fukuda, Tokyo, Japan, assignors to Asahi Kasei Kogyo Kabushiki Kaisha, Kita-ku, Osaka, Japan
No Drawing. Filed Oct. 24, 1967, Ser. No. 677,753
Claims priority, application Japan, Oct. 31, 1966, 41/71,351; July 3, 1967, 42/42,297
Int. Cl. C08g 1/22
U.S. Cl. 260—67      9 Claims

ABSTRACT OF THE DISCLOSURE

The acetylation by 1-cyanovinyl acetate of the terminal hydroxy group of a polyoxymethylene having at least one terminal hydroxy group and a molecular weight of more than 10,000 affords a greater rate of acetylation than that in conventional acetylation known heretofore without being accompanied by the decomposition of polyoxymethylene at high temperatures by acetic anhydride.

BACKGROUND OF THE INVENTION

Field of the invention

This invention relates to a process for stabilizing a high molecular weight polyoxymethylene by reacting terminal hydroxy groups thereof with 1-cyanovinyl acetate.

Description of the prior art

Normally, polyoxymethylene having a high degree of polymerization obtained in the catalytic polymerization or radiation-induced polymerization, if not treated, is unstable and highly susceptible to the depolymerization from the terminal hydroxy groups, thus, it is difficult to produce films, fibers or other shaped articles having good thermal stability therefrom.

In general, the instability of polyoxymethylene obtained by the polymerization has been regarded as attributable to the free hydroxy groups present at the terminals thereof and it is well known that the thermal stability of such polyoxymethylene may be remarkably improved if these terminal hydroxy groups are protected by stable organic groups.

As the methods of stabilizing the free hydroxy groups of polyoxymethylene, the esterification, acetoacetylation, methyletherification, 2-cyanoethyletherification, 2-hydroxyethyletherification or urethanation have been known heretofore and the resulting polyoxymethylene of whch terminal hydroxy groups have been protected according to these processes exhibits an extremely high thermal stability.

Among these processes exemplified above, the process for acetoacetylating the terminal hydroxy groups is most conventional and the process which comprises reacting polyoxymethylene with acetic anhydride at a high temperature in the presence of a base has been known well heretofore.

However, the acetylation with acetic anhydride has a disadvantage in that polyoxymethylene is decomposed by acetic acid at a high temperature as is known well.

Now, acetic anhydride per se inevitably contains acetic acid as an impurity—a complete separation of acetic acid from acetic anhydride is considered very difficult in the production of acetic anhydride by the reaction of acetic acid with ketene—and acetic anhydride tends to produce acetic acid as a result of thermal decomposition thereof at a high temperature as disclosed in Journal of Organic Chem., 18, 1055 (1953) and Trans. Faraday Soc., 47, 269 (1951). Moreover, an equivalent amount of acetic acid is by-produced in the acetylation of the terminal hydroxy groups of polyoxymethylene with acetic anhydride.

Thus, the loss of polyoxymethylene by the action of acetic acid is not negligible in the acetylation of polyoxymethylene with acetic anhydride, and it will be readily appreciated that the decrease in the yield and the change in the molecular weight of the product polymer by the action of acetic acid in the course of the acetylation present a serious problem.

Another disadvantage of the acetylation with acetic anhydride resides in that the rate of acetylation is quite low.

That is, in the reaction of polyoxymethylene with acetic anhydride in the presence of a catalyst such as tertiary amine or sodium acetate, the heating period of from two to several hours is normally required at a reaction temperature in the vicinity of 130°–160° C. This indicates that the rate of acetylation of terminal hydroxy groups with acetic anhydride is very slow and, under such circumstances, polyoxymethylene having hydroxy groups at the terminals is thermally decomposed as a lapse of time in the course of the acetylation.

As a result, obviously, the loss of unreacted polyoxymethylene by thermal decomposition in the course of the acetylation is not negligible.

In summary, it is to be understood that the decrease in the yield and the change in the molecular weight of the product polymer are the outstanding disadvantages in the acetylation of polyoxymethylene with acetic anhydride.

SUMMARY OF THE INVENTION

It is, therefore, an object of this invention to provide an improved process for acetylating polyoxymethylene free from the disadvantages accompanied by the prior art processes known heretofore.

It has now been found that the object mentioned above can be accomplished by acetylating polyoxymethylene with 1-cyanovinyl acetate.

1-cyanovinyl acetate which may be used in the process of this invention is a compound of the formula

(I)

It may be obtained from hydrogen cyanide and ketene, for example, according to the process as described in Chem. Listy. 48, 217 (1954), J. Smrt et al., and it can be produced inexpensively on a commercial scale.

In the past, this compound has never been used for the acetylation of alcohols, except that S. Deakin et al. carried out an experiment in an attempt to obtain information in determining the chemical structure of this compound by reacting the same with ethanol and, as a result, confirmed the formation of ethyl acetate qualitatively (cf. J. Chem. Soc., 97, 1971 (1910)).

We have conducted a thorough study of the acetylation with 1-cyanovinyl acetate which can be obtained quite advantageously on a commercial scale and, as a result, we have found that this compound has far higher ability in acetylation than that of acetic anhydride. Thus, it has now been found that a stabilized acetylated polyoxymethylene can be obtained quite efficiently by acetylating the terminal hydroxy groups of polyoxymethylene with this compound.

For instance, as can be noted from the Examples described hereinafter, when polyoxymethylene is reacted with 1-cyanovinyl acetate at a temperature of 145–155° C., a substantially stabilized acetylated polyoxymethylene can be obtained in about 5 minutes.

It should be noted as an outstanding feature of this invention that there is no important decomposition of polyoxymethylene to be acetylated in the present process, unlike in the acetylation of the same with acetic anhydride, since there is no influence of acetic acid which is originally contained in acetic anhydride as an impurity, or, by-produced in the course of the acetylation with acetic anhydride. Thus, the present process affords the acetylated polyoxymethylene in a high yield, free from important decrease in the viscosity, i.e. the molecular weight of the resulting polyoxymethylene.

This is to be understood that the present invention has achieved a significant technical progress, eliminating the greatest of obstacles accompanied by the acetylation of polyoxymethylene with acetic anhydride known heretofore.

In the process of this invention, an effective stabilizing reaction may be carried out in the presence of acidic or alkaline catalyst. However, the use of alkaline catalyst is in general more preferable than acidic catalyst. Since normally polyoxymethylene is decomposed by acidic substances, it is quite advantageous that alkaline substances can be used as catalysts. In this regard, 1-cyanovinyl acetate exhibits an outstanding performance in contrast with other reagents such as isopropenyl acetate which hardly show acetylating ability unless in the presence of strongly acidic catalyst.

The essence of this invention resides in the production of acetylated polyoxymethylene having a high thermal stability by reacting polyoxymethylene having hydroxy groups at the terminals thereof with 1-cyanovinyl acetate.

The starting polyoxymethylene which may be used in the process of this invention includes all types of polyoxymethylene having at least one hydroxy group at the terminals thereof and having a molecular weight of more than 10,000. For example, they may be obtained by the bulk polymerization, solution polymerization, suspension polymerization or radiation-induced polymerization and other types of polymerizations of formaldehyde or trioxane.

It further includes copolymers having at least one hydroxymethoxy group at the terminal thereof obtained by the copolymerization of formaldehyde or trioxane and comonomers copolymerizable therewith.

The process of this invention can be practised quite simply, i.e. it suffices to bring polyoxymethylene into contact with 1-cyanovinyl acetate at a predetermined temperature for a predetermined period. In carrying out the reaction, there is imposed no particular restriction on the reaction conditions and a wide range of reaction conditions conceivable by those skilled in the art can of course be adopted.

For example, the reaction media inert to polyoxymethylene and 1-cyanovinyl acetate may be used in the present reaction.

Examples of the preferable media include aliphatic hydrocarbons such as hexane and tetralin; aromatic hydrocarbons such as toluene and benzene; ether compounds such as isopropyl ether, dioxane and tetrahydrofuran; and polar solvents such as acetone, butyrolactone, dimethylformamide, sulfolane and acetonitrile.

In the process of this invention, the diluting effect of the solvent is particularly remarkable and it shows a great effect in the suppression of side-reaction as well as in the prevention of coloration of the reaction mixture. Above all, acetonitrile is a particularly preferable diluting agents and the polymer obtained by using the same hardly contains coloring matter and a film produced therefrom by a thermal-moulding is also pure white.

The reaction temperature of a wide range can be adopted, and preferably a temperature of from normal temperature to 200° C., and most preferably 100–180° C., is used.

The reaction time varies from several minutes to several weeks depending upon the reaction conditions adopted. However, a substantially complete acetylation can be achieved generally in a reaction period of 5–20 minutes, since 1-cyanovinyl acetate shows an extremely high acetylation ability in the presence of alkaline catalyst.

In the process of this invention, an acidic or an alkaline catalyst is normally used, and, particularly, alkaline catalyst is effectively used although the reaction may be proceeded in the absence of catalyst.

Alkaline catalysts which may be used in the process of this invention include salts of weak acid and strong alkali, for example, lithium, sodium, potassium, calcium or barium salts of formic, acetic, propionic, isobutyric, stearic, palmitic, malonic, benzoic, carbonic, thiocyanic, sulfurous, phosphoric acids or hydrogen cyanide; alkaline quaternary ammonium salts such as trimethylbenzylammonium benzoate and tetrabutylammonium acetate; amines unsusceptible to acetylation such as triethylamine, tributylamine and pyridine; and metal oxides such as calcium oxide, barium oxide and magnesium oxide.

Acidic catalysts which may be used in the process of this invention include phosphoric acid, organic sulfonic acids such as p-toluenesulfonic acid and carboxylic acids such as trichloroacetic acid; Friedel-Crafts type catalysts such as boron trifluoride or complex compounds such as boron trifluoride-ether complex; and salts of weak alkali and strong acid such as tributylamine hydrochloride. Also, betaine may be used as an effective catalyst.

Since polyoxymethylene tends to be decomposed by the action of a strong alkali or acid, particularly by a strong acid, it is preferable to use weakly alkaline or weakly acidic catalysts as mentioned above. However, when a powerful catalyzing effect is particularly desired even if the molecular weight may be decreased to some extent, strongly alkaline or acidic catalysts may be employed.

In the process of this invention, the amount of catalyst used is 0.005–10% by weight based on the weight of 1-cyanovinyl acetate, or even more. However, the amount must not be less than 0.01% by weight based on the weight of 1-cyanovinyl acetate in order to attain a satisfactory rate of reaction and a complete acetylation of the terminal hydroxy groups of polyoxymethylene.

In the process of this invention, it is preferable to use 5–20 parts by weight of the reactant containing 1-cyanovinyl acetate per part by weight of polyoxymethylene, in order to carry out the reaction advantageously. The reactant referred to herein designates a mixture consisting of the inert reaction medium mentioned above and 1-cyanovinyl acetate, and the proportion of 1-cyanovinyl acetate contained therein is 3–100% by weight based on the weight of the total mixture, and most preferably 10–20% by weight of the same basis as above from the standpoints of the reaction rate and the economy.

DESCRIPTION OF PREFERRED EMBODIMENTS

This invention may be explained more fully in the following examples. It should not be construed, however, that these examples restrict this invention as they are given merely by way of illustration.

In the following examples, "part" referred to therein means "by weight" unless otherwise specified.

Example 1

Formaldehyde solution obtained by blowing formaldehyde gas containing 0.5% of water into toluene was added to a mixed solution of toluene and hexane in a ratio of 1:1, containing 0.014 mol percent of dibutyltindilaurate at −30° C. and the reaction was carried out to give polyoxymethylene having an intrinsic viscosity of 2.34 as measured in p-chlorophenol containing 2% of α-pinene at 60° C.

To a glass ampoule which was sufficiently flushed with nitrogen were charged a part of polyoxymethyl thus obtained, 0.5 part of 1-cyanovinyl acetate, 8 parts of acetonitrile and 0.03 part of tripropylamine and, after the ampoule was sealed, the reaction mixture was heated at 154° C. for 15 minutes with stirring. The polyoxymethylene was dissolved completely immediately after the heating, and a great majority of the polymer was precipitated again by cooling after the reaction. Then, the reactor tube was unsealed and the polymer precipitated was filtered and the resulting polymer was washed with 10 parts of acetonitrile for three times and dried at 40° C. in vacuo for 24 hours to give 0.91 part of a pure white powdered polymer.

The thermal decomposition constant $K_{222}°$ at 220° C. of the resulting polyoxymethylene was 0.03 and the intrinsic viscosity was 2.38, whereas the $K_{222}°$ of the starting polyoxymethylene which is not subjected to the present stabilization reaction was 25.2.

It can be noted clearly that the thermal stability has been greatly improved.

An infrared absorption spectrum of the resulting polyoxymethylene revealed that no absorption of hydroxy group was observed at 3340 cm.$^{-1}$ and, instead, a remarkable absorption of ester carbonyl was observed at 1750 cm.$^{-1}$.

The stabilized polyoxymethylene thus obtained was heat-extruded at 190–200° C. and there was obtained a pure white tough film having a thickness of 3 mm.

Example 2

One part of polyoxymethylene having an intrinsic viscosity of 2.20, 0.5 part of 1-cyanovinyl acetate, 8 parts of acetonitrile and 0.002 part of finely powdered sodium acetate were reacted at 154° C. for 20 minutes. After the completion of the reaction, the reaction mixture was cooled and the polymer precipitated was filtered, then, the resulting polymer was washed first with 10 parts of acetonitrile for three times, second with 10 parts of water for once and last with 20 parts of acetone for twice, and there was obtained a white polymer having a thermal stability $K_{222}$ of 0.04. The polymer was formed into a white opaque film.

Example 3

To a glass ampoule which was sufficiently flushed with nitrogen were charged 1 part of the same polyoxymethylene as used in Example 1, 1 part of 1-cyanovinyl acetate, 8 parts of acetone and 0.003 part of sodium acetate and, after sealing, the reaction was carried out for 5 minutes by shaking the reactor tube in an oil bath maintained at 154° C. Although the polymer was completely dissolved in the meantime, the polymer was precipitated by allowing the reaction mixture to stand to cool. The polymer thus precipitated was filtered and washed first with acetone, second with 10% acetone and last with acetone, and dried at 40° C. in vacuo to give 0.96 part of a white powder polymer having a $K_{222}$ of 0.04 and an intrinsic viscosity of 2.32.

Example 4

To a pressure-resistant glass tube were charged 1 part of polyoxymethylene having an intrinsic viscosity of 2.60 as measured in p-chlorophenol containing 2% of α-pinene at 60° C., 1 part of 1-cyanovinyl acetate, 8 parts of acetone and 0.003 part of sodium acetate, and the reaction was carried out in an oil bath at 155° C. for 20 minutes with shaking.

After the completion of the reaction, the reaction mixture was cooled and the polymer precipitated was filtered and washed first with 50 parts of acetone for once, then, with 60 parts of 10% acetone for three times and dried at 40° C. in vacuo to yield 0.96 part of a polymer.

The polymer had a thermal decomposition constant $K_{222}$ of 0.03 and an intrinsic viscosity of 2.60 as measured in p-chlorophenol containing 2% of α-pinene at 60° C.

Example 5

One part of polyoxymethylene having an intrinsic viscosity of 1.94 as measured in p-chlorophenol containing 2% of α-pinene at 60° C., 5 parts of 1-cyanovinyl acetate, 5 parts of acetone and 0.003 part of sodium acetate was reacted at 155° C. for 30 minutes.

By following the same procedures as described in Example 4 thereafter, 0.95 part of polyoxymethyleneglycol diacetate having a $K_{222}$ of 0.05 and an intrinsic viscosity of 1.89 was obtained.

Example 6

One part of the same polyoxymethylene as used in Example 5, 1 part of 1-cyanovinyl acetate, 8 parts of acetone and 0.003 part of sodium acetate were reacted at 143° C. for 15 minutes with stirring. There was obtained 0.96 part of polyoxymethyleneglycol diacetate having a $K_{222}$ of 0.04 and an intrinsic viscosity of 1.92.

Example 7

One part of the same polyoxymethylene as used in Example 5, 2 parts of 1-cyanovinyl acetate, 8 parts of acetone and 0.005 part of betaine were reacted at 155° C. for 10 minutes.

There was obtained 0.94 part of polyoxymethyleneglycol diacetate having a $K_{222}$ of 0.04 and an intrinsic viscosity of 1.93.

Example 8

One part of the same polyoxymethylene as used in Example 5, 1 part of 1-cyanovinyl acetate, 8 parts of acetone and 0.006 part of tributylamine were reacted at 150° C. for 10 minutes.

There was obtained 0.96 part of polyoxymethyleneglycol diacetate having a $K_{222}$ of 0.05 and an intrinsic viscosity of 1.91.

Example 9

One part of polyoxymethylene as used in Example 5, 1 part of 1-cyanovinyl acetate, 8 parts of acetone and 0.009 part of trimethylbenzylammonium benzoate were reacted at 155° C. for 10 minutes. There was obtained 0.98 part of polyoxymethyleneglycol diacetate having a $K_{222}$ of 0.03 and an intrinsic viscosity of 1.90.

Example 10

3.0 part of polyoxymethylene having an intrinsic viscosity of 2.10 as measured in p-chlorophenol containing 2% of α-pinene at 60° C. and having a $K_{222}$ of 7.86 in vacuo, 6 parts of 1-cyanovinyl acetate, 15 parts of dioxane and 0.009 part of trimethylbenzylammonium benzoate were reacted as in Example 3 at 150° C. for 30 minutes. There was obtained 2.9 part of stabilized polyoxymethylene having a $K_{222}$ of 0.04 and an intrinsic viscosity of 2.10.

Example 11

One part of the same polyoxymethylene as used in Example 5, 2 parts of 1-cyanovinyl acetate, 8 parts of toluene and 0.008 part of trimethylbenzylammonium benzoate were reacted at 155° C. for 15 minutes.

There was obtained 0.97 part of polyoxymethyleneglycol diacetate having a $K_{222}$ of 0.05 and an intrinsic viscosity of 1.92.

Example 12

One part of the same polyoxymethylene as used in Example 5, 2 parts of 1-cyanovinyl acetate, 3 parts of toluene, 3.5 parts of hexane and 0.008 part of trimethylbenzylammonium benzoate were reacted at 150° C. for 10 minutes. There was obtained 0.96 part of polyoxymethyleneglycol diacetate having a $K_{222}$ of 0.04 and an intrinsic viscosity of 1.94.

Example 13

One part of the same polyoxymethylene as used in Example 5, 5 parts of 1-cyanovinyl acetate and 0.001 part of sodium acetate were reacted at 143° C. for 15 minutes.

There was obtained 0.96 part of polyoxymethyleneglycol diacetate having a $K_{222}$ of 0.04 and an intrinsic viscosity of 1.90.

We claim:
1. Process for stabilizing polyoxymethylene which comprises reacting a polyoxymethylene having at least one terminal hydroxy group and a molecular weight of more than 10,000 with 1-cyanovinyl acetate.
2. Process according to claim 1 wherein said reaction is carried out at a temperature of normal temperature to 200° C.
3. Process according to claim 1 wherein said 1-cyanovinyl acetate is a mixture of an inert medium and 3–100% by weight of 1-cyanovinyl acetate based on the total weight of the mixture.
4. Process according to claim 3 wherein said medium is a member selected from the group consisting of aliphatic hydrocarbons such as hexane and tetralin; aromatic hydrocarbons such as toluene and benzene; ether compounds such as isopropyl ether, dioxane and tetrahydrofuran; and polar solvents such as acetone, butyrolacetone, dimethylformamide, sulfolane and acetonitrile.
5. Process according to claim 3 wherein said medium is acetonitrile.
6. Process according to claim 3 wherein said mixture is used in an amount of 5–20 parts by weight per part by weight of polyoxymethylene.
7. Process for stabilizing polyoxymethylene which comprises reacting a polyoxymethylene having at least one terminal hydroxy group and a molecular weight of more than 10,000 with 1-cyanovinyl acetate in the presence of an acetylating catalyst selected from the group consisting of alkaline catalysts such as lithium, sodium, potassium, calcium and barium salts of formic, acetic, propionic, isobutyric, stearic, palmitic, malonic, benzoic, carbonic, thiocyanic, sulfurous, phosphoric acids and hydrogen cyanide; alkaline quaternary ammonium salts such as trimethylbenzylammonium benzoate and tetrabutylammonium acetate; amines unsusceptible to acetylation such as triethylamine, tributylamine and pyridine; and metal oxides such as calcium oxide, barium oxide and magnesium oxide, and acidic catalyst such as phosphoric acid, organic sulfonic acids such as p-toluenesulfonic acid and carboxylic acids such as trichloroacetic acid; Friedel-Crafts type catalysts such as boron trifluoride and complex compounds such as boron-trifluoride-ether complex; salts of weak alkali and strong acid such as tributylamine hydrochloride and betaine.
8. Process according to claim 7 wherein said reaction is carried out in the presence of said alkaline in a reaction period of 5–20 minutes.
9. Process according to claim 7 wherein said catalyst is used in an amount of 0.005–10% by weight based on the weight of 1-cyanovinyl acetate.

References Cited
UNITED STATES PATENTS
3,215,724   11/1965   Strobel et al. _____ 260—465

WILLIAM H. SHORT, Primary Examiner
L. M. PHYNES, Assistant Examiner

U.S. Cl. X.R.
260—45.85, 45.9